(No Model.)

G. WEINMANN.
SMOKING PIPE.

No. 451,313. Patented Apr. 28, 1891.

WITNESSES:
Jol. N. Rosenbaum.
Henry Huber.

INVENTOR:
Gustav Weinmann
BY
Goepel & Raegener
ATTORNEYS.

UNITED STATES PATENT OFFICE.

GUSTAV WEINMANN, OF NEW YORK, N. Y.

SMOKING-PIPE.

SPECIFICATION forming part of Letters Patent No. 451,313, dated April 28, 1891.

Application filed December 11, 1890. Serial No. 374,292. (No model.)

*To all whom it may concern:*

Be it known that I, GUSTAV WEINMANN, of the city, county, and State of New York, a citizen of the Empire of Germany, have invented certain new and useful Improvements in Smoking-Pipes, of which the following is a specification.

This invention relates to an improved smoking-pipe in which the nicotine is prevented in a reliable manner from being conveyed into the stem of the pipe, which can be readily cleaned, and which can be supplied at a very low price; and the invention consists of a smoking-pipe the bowl of which is closed at the lower end by a bottom layer of suitable cement and reduced in thickness above the bottom, said reduced part being provided with radial holes, a drip-cup applied to the lower end of the bowl, and a stem inserted in said drip-cup, as will be more fully described hereinafter, and finally pointed out in the claim.

Figure 1:
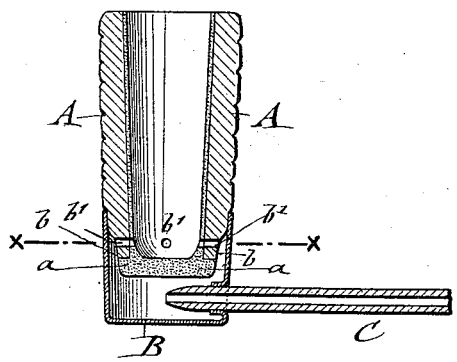
Figure 2:
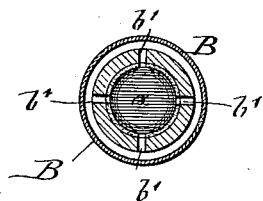

In the accompanying drawings, Figure 1 represents a vertical central section of my improved smoking-pipe; and Fig. 2, a horizontal section of the same on the line $x$ $x$, Fig. 1.

Similar letters of reference indicate corresponding parts.

Referring to the drawings, A represents the bowl of my improved smoking-pipe, which is made either of corn-cob or of briar or other wood, and which is closed at the lower end by a layer $a$ of plaster-of-paris or other suitable cement, which is spread over the same by inserting a core into the bowl and permitting the cement to set while the core is in the bowl. Above the bottom $a$ a shoulder $b$ is turned off at the lower end of the bowl A, so that the bowl has a reduced thickness at that part. Radial holes $b'$ are drilled through the reduced portion $b$, so that the smoke can pass freely from the interior of the bowl to the stem. A drip-cup B, made of sheet metal, is attached to the lower part of the bowl in such a manner as to extend above the perforated lower part of the same and form a receptacle for the nicotine-containing moisture which is collected in the bottom part of the drip-cup. The stem C is inserted through an opening of the drip-cup, the nicotine being prevented from passing to the stem, so that only pure smoke is supplied.

Owing to the arrangement of the holes in the lower part of the bowl and the connection of the latter with the drip-cup above said holes, the heat from the bowl is not transmitted to the drip-cup, so that the same remains sufficiently cool that the pipe can be held by the fingers without burning the same.

The construction of the pipe is simple and inexpensive, so that it can be supplied at a very low price, while still providing an effective receptacle for the nicotine-containing moisture. When the bowl has been used for some time it may be replaced by a new one, or an entirely new pipe may be bought, as the price is small enough for this purpose.

Having thus described my invention, I claim as new and desire to secure by Letters Patent—

A tobacco-pipe composed of a bowl the lower end of which is reduced in thickness and provided with radial holes in said reduced end, a cement bottom applied to the reduced end of the bowl, a metal drip-cup embracing the lower part of the bowl and extending above the reduced portion and frictionally held thereon, and a stem inserted into an opening of the drip-cup below the bottom of the bowl, substantially as set forth.

In testimony that I claim the foregoing as my invention I have signed my name in presence of two subscribing witnesses.

GUSTAV WEINMANN.

Witnesses:
PAUL GOEPEL,
CHARLES SCHROEDER.